(12) United States Patent
Lim

(10) Patent No.: US 9,950,256 B2
(45) Date of Patent: Apr. 24, 2018

(54) HIGH-DIMENSIONAL TOUCHPAD GAME CONTROLLER WITH MULTIPLE USAGE AND NETWORKING MODALITIES

(75) Inventor: Seung E. Lim, Belmont, CA (US)

(73) Assignee: NRI R&D PATENT LICENSING, LLC, San Antonio, TX (US)

( * ) Notice: Subject to any disclaimer, the term of this patent is extended or adjusted under 35 U.S.C. 154(b) by 859 days.

(21) Appl. No.: 13/198,691

(22) Filed: Aug. 4, 2011

(65) Prior Publication Data
US 2012/0034978 A1 Feb. 9, 2012

Related U.S. Application Data

(60) Provisional application No. 61/371,153, filed on Aug. 5, 2010.

(51) Int. Cl.
A63F 9/24 (2006.01)
A63F 13/335 (2014.01)
(Continued)

(52) U.S. Cl.
CPC .......... *A63F 13/335* (2014.09); *A63F 13/214* (2014.09); *A63F 13/235* (2014.09);
(Continued)

(58) Field of Classification Search
CPC .. A63F 13/214; A63F 13/92; A63F 2300/403; A63F 2300/204; A63F 2300/1068
(Continued)

(56) References Cited

U.S. PATENT DOCUMENTS 1,947,020 A 2/1934 Ranger
3,493,669 A 2/1970 Elbrecht et al.
(Continued)

FOREIGN PATENT DOCUMENTS

EP 0 574 213 A1 12/1993

OTHER PUBLICATIONS

Nintendo DS. Wikipedia.org. Online. May 28, 2010. Accessed via the Internet. Accessed Mar. 21, 2016. <URL: http://wayback.archive.org/web/20100528090358/http://en.wikipedia.org/wiki/Nintendo_DS>.*

(Continued)

*Primary Examiner* — Dmitry Suhol
*Assistant Examiner* — Carl V Larsen
(74) *Attorney, Agent, or Firm* — Procopio, Cory, Hargreaves & Savitch LLP

(57) ABSTRACT

A device comprising a High Dimensional Touch Parameter (HDTP) touch capability that can selectively function, as desired by the user, as one or more of a game controller that connects to a game console via network connections, an independent portable/mobile game device with limited but sufficient capacity of processor/memory, a controller for a game console connected remotely through the internet and or a storage device/media player that can store gaming history, personal information, or media files. In an embodiment the device comprises at least one processor for executing at least one algorithm, the algorithm including at least a game, at least one touch sensor providing real-time tactile information to at least one algorithm, the algorithm implementing at least on HDTP function, and at least one networking element configured to network the device to at least the internet.

20 Claims, 14 Drawing Sheets

(51) Int. Cl.
*A63F 13/235* (2014.01)
*A63F 13/214* (2014.01)
*A63F 13/95* (2014.01)
*A63F 13/92* (2014.01)

(52) U.S. Cl.
CPC .............. *A63F 13/92* (2014.09); *A63F 13/95* (2014.09); *A63F 2300/1031* (2013.01); *A63F 2300/1068* (2013.01); *A63F 2300/204* (2013.01); *A63F 2300/208* (2013.01); *A63F 2300/403* (2013.01); *A63F 2300/407* (2013.01)

(58) Field of Classification Search
USPC ........... 463/16, 30, 36, 39, 40; 345/173, 684
See application file for complete search history.

(56) References Cited

U.S. PATENT DOCUMENTS

| | | |
|---|---|---|
| 3,591,699 A | 7/1971 | Cutler |
| 3,612,741 A | 10/1971 | Marshall |
| 3,651,242 A | 3/1972 | Evans |
| 3,730,046 A | 5/1973 | Spence |
| 3,742,133 A | 6/1973 | O'Sullivan |
| 3,805,091 A | 4/1974 | Colin |
| 3,813,473 A | 5/1974 | Terymenko |
| 3,878,748 A | 4/1975 | Spence |
| 3,956,959 A | 5/1976 | Ebihara et al. |
| 3,962,945 A | 6/1976 | Creager et al. |
| 4,075,921 A | 2/1978 | Heet |
| 4,080,867 A | 3/1978 | Ratanangsu |
| 4,117,413 A | 9/1978 | Moog |
| 4,122,742 A | 10/1978 | Deutsch |
| 4,151,368 A | 4/1979 | Fricke et al. |
| 4,182,213 A | 1/1980 | Iodice |
| 4,274,321 A | 6/1981 | Swartz |
| 4,318,327 A | 3/1982 | Toups |
| 4,365,533 A | 12/1982 | Clark, Jr. et al. |
| 4,748,676 A | 5/1988 | Miyagawa |
| 4,781,099 A | 11/1988 | Kolke |
| 4,794,838 A | 1/1989 | Corrigau, III |
| 4,797,608 A | 1/1989 | White |
| 4,852,444 A | 8/1989 | Hoover et al. |
| 4,899,137 A | 2/1990 | Behrens et al. |
| 4,991,488 A | 2/1991 | Fala et al. |
| 5,033,352 A | 7/1991 | Kellogg et al. |
| 5,045,687 A | 9/1991 | Gurner |
| 5,070,399 A | 12/1991 | Martel |
| 5,146,833 A | 9/1992 | Lui |
| 5,159,140 A | 10/1992 | Kimpara et al. |
| 5,218,160 A | 6/1993 | Grob-De Velga |
| 5,233,123 A | 8/1993 | Rose et al. |
| 5,237,647 A | 8/1993 | Roberts et al. |
| 5,262,585 A | 11/1993 | Greene et al. |
| 5,270,711 A | 12/1993 | Knapp |
| 5,281,754 A | 1/1994 | Farrett et al. |
| 5,292,999 A | 3/1994 | Tumura |
| 5,341,133 A | 8/1994 | Savoy et al. |
| 5,357,048 A | 10/1994 | Sgroi |
| 5,378,850 A | 1/1995 | Tumura |
| 5,386,219 A | 1/1995 | Greanias et al. |
| 5,420,936 A | 5/1995 | Fitzpatrick et al. |
| 5,440,072 A | 8/1995 | Willis |
| 5,442,168 A | 8/1995 | Gurner et al. |
| 5,459,282 A | 10/1995 | Willis |
| 5,471,008 A | 11/1995 | Fujita et al. |
| 5,475,214 A | 12/1995 | DeFranco et al. |
| 5,565,641 A | 10/1996 | Gruenbaum |
| 5,585,588 A | 12/1996 | Tumura |
| 5,592,572 A | 1/1997 | Le |
| 5,592,752 A | 1/1997 | Fu |
| 5,659,145 A | 8/1997 | Weil |
| 5,659,466 A | 8/1997 | Norris et al. |
| 5,665,927 A | 9/1997 | Taki et al. |
| 5,668,338 A | 9/1997 | Hewitt et al. |
| 5,675,100 A | 10/1997 | Hewlett |
| 5,719,347 A | 2/1998 | Masubachi et al. |
| 5,719,561 A | 2/1998 | Gonzales |
| 5,741,993 A | 4/1998 | Kushimiya |
| 5,748,184 A | 5/1998 | Shieh |
| 5,786,540 A | 7/1998 | Westlund |
| 5,763,806 A | 8/1998 | Willis |
| 5,801,340 A | 9/1998 | Peter |
| 5,805,137 A | 9/1998 | Yasutake |
| 5,824,930 A | 10/1998 | Ura et al. |
| 5,827,989 A | 10/1998 | Fay et al. |
| 5,841,428 A | 11/1998 | Jaeger et al. |
| 5,850,051 A | 12/1998 | Machover et al. |
| 5,852,251 A | 12/1998 | Su et al. |
| 5,889,236 A | 3/1999 | Gillespie et al. |
| 5,932,827 A | 8/1999 | Osborne et al. |
| 5,969,283 A | 10/1999 | Looney et al. |
| 5,977,466 A | 11/1999 | Muramatsu |
| 5,986,224 A | 11/1999 | Kent |
| 6,005,545 A * | 12/1999 | Nishida et al. ............... 345/603 |
| 6,037,937 A | 3/2000 | Beaton et al. |
| 6,047,073 A | 4/2000 | Norris et al. |
| 6,051,769 A | 4/2000 | Brown, Jr. |
| 6,100,461 A | 8/2000 | Hewitt |
| 6,107,997 A | 8/2000 | Ure |
| 6,140,565 A | 10/2000 | Yamauchi et al. |
| 6,204,441 B1 | 3/2001 | Asahi et al. |
| 6,225,975 B1 * | 5/2001 | Furuki et al. ................. 345/156 |
| 6,285,358 B1 | 9/2001 | Roberts |
| 6,288,317 B1 | 9/2001 | Willis |
| 6,310,279 B1 | 10/2001 | Suzuki et al. |
| 6,310,610 B1 | 10/2001 | Beaton et al. |
| 6,320,112 B1 | 11/2001 | Lotze |
| 6,323,846 B1 | 11/2001 | Westerman et al. |
| 6,360,019 B1 | 3/2002 | Chaddha |
| 6,363,159 B1 | 3/2002 | Rhoads |
| 6,373,475 B1 | 4/2002 | Challis |
| 6,392,636 B1 | 5/2002 | Ferrari et al. |
| 6,392,705 B1 | 5/2002 | Chaddha |
| 6,400,436 B1 | 6/2002 | Senior |
| 6,404,898 B1 | 6/2002 | Rhoads |
| 6,408,087 B1 | 6/2002 | Kramer |
| 6,570,078 B2 | 5/2003 | Ludwig |
| 6,703,552 B2 | 3/2004 | Haken |
| 6,793,619 B1 | 9/2004 | Blumental |
| 6,921,336 B1 * | 7/2005 | Best ......... A63F 13/10 463/32 |
| 7,030,860 B1 | 4/2006 | Hsu et al. |
| 7,371,163 B1 * | 5/2008 | Best ......... A63F 13/10 463/1 |
| 7,408,108 B2 | 8/2008 | Ludwig |
| 7,557,797 B2 | 7/2009 | Ludwig |
| 7,598,949 B2 | 10/2009 | Han |
| 7,611,409 B2 * | 11/2009 | Muir et al. ...................... 463/29 |
| 8,154,529 B2 | 4/2012 | Sleeman |
| 8,169,414 B2 | 5/2012 | Lim |
| 8,170,346 B2 | 5/2012 | Ludwig |
| 8,179,376 B2 | 5/2012 | Griffin |
| 8,345,014 B2 | 1/2013 | Lim |
| 8,414,373 B2 * | 4/2013 | Bone ......... G07F 17/32 463/16 |
| 8,500,558 B2 * | 8/2013 | Smith ......... A63F 13/12 345/419 |
| 8,502,790 B2 * | 8/2013 | Osann, Jr. ......... G06F 1/1616 345/156 |
| 8,665,218 B2 * | 3/2014 | Shiu ......... G06F 1/1626 345/168 |
| 8,698,764 B1 * | 4/2014 | Karakotsios ......... G06F 1/1692 345/173 |
| 8,795,083 B2 * | 8/2014 | Sasaki ......... A63F 13/35 463/40 |
| 9,019,237 B2 * | 4/2015 | Ludwig ......... G06F 3/038 345/158 |
| 2001/0036299 A1 | 11/2001 | Senior |
| 2002/0005108 A1 | 1/2002 | Ludwig |
| 2002/0093491 A1 | 7/2002 | Gillespie et al. |
| 2004/0021681 A1 * | 2/2004 | Liao ......... G06F 1/1616 715/702 |
| 2004/0074379 A1 | 4/2004 | Ludwig |

(56) References Cited

U.S. PATENT DOCUMENTS

| | | |
|---|---|---|
| 2004/0118268 A1 | 6/2004 | Ludwig |
| 2004/0251402 A1 | 12/2004 | Reime |
| 2006/0084504 A1* | 4/2006 | Chan ............ A63F 13/06 463/39 |
| 2006/0252530 A1* | 11/2006 | Oberberger et al. ........ 463/29 |
| 2007/0044019 A1 | 2/2007 | Moon |
| 2007/0063990 A1 | 3/2007 | Park |
| 2007/0229477 A1* | 10/2007 | Ludwig ............ G10H 1/00 345/173 |
| 2008/0010616 A1 | 1/2008 | Algreatly |
| 2008/0012828 A1* | 1/2008 | Yasutake ........ G06F 3/0338 345/163 |
| 2008/0143690 A1 | 6/2008 | Jang |
| 2008/0164076 A1 | 7/2008 | Orsley |
| 2008/0259053 A1 | 10/2008 | Newton |
| 2008/0300055 A1 | 12/2008 | Lutnick |
| 2008/0309634 A1 | 12/2008 | Hotelling et al. |
| 2009/0006292 A1 | 1/2009 | Block |
| 2009/0027351 A1 | 1/2009 | Zhang et al. |
| 2009/0124348 A1 | 5/2009 | Yoseloff et al. |
| 2009/0146968 A1 | 6/2009 | Narita et al. |
| 2009/0167701 A1 | 7/2009 | Ronkainen |
| 2009/0213081 A1* | 8/2009 | Case, Jr. ............ G06F 1/1616 345/173 |
| 2009/0254869 A1 | 10/2009 | Ludwig et al. |
| 2010/0013860 A1 | 1/2010 | Mandella |
| 2010/0041480 A1* | 2/2010 | Wong ............ A63F 13/06 463/37 |
| 2010/0044121 A1 | 2/2010 | Graham et al. |
| 2010/0060607 A1 | 3/2010 | Ludwig |
| 2010/0079385 A1 | 4/2010 | Holmgren |
| 2010/0087241 A1* | 4/2010 | Nguyen et al. ........ 463/17 |
| 2010/0090963 A1 | 4/2010 | Dubs |
| 2010/0110025 A1 | 5/2010 | Lim |
| 2010/0117978 A1 | 5/2010 | Shirado |
| 2010/0177118 A1 | 7/2010 | Sytnikov |
| 2010/0231612 A1* | 9/2010 | Chaudhri et al. .......... 345/684 |
| 2010/0232710 A1 | 9/2010 | Ludwig |
| 2010/0279769 A1* | 11/2010 | Kidakam ............ A63F 13/26 463/31 |
| 2010/0279773 A1* | 11/2010 | Atzmon ............ A63F 13/06 463/38 |
| 2010/0289754 A1 | 11/2010 | Sleeman et al. |
| 2010/0302172 A1 | 12/2010 | Wilairat |
| 2010/0328032 A1 | 12/2010 | Rofougaran |
| 2011/0007000 A1 | 1/2011 | Lim |
| 2011/0037735 A1 | 2/2011 | Land |
| 2011/0063251 A1 | 3/2011 | Geaghan |
| 2011/0086706 A1* | 4/2011 | Zalewski ........ 463/36 |
| 2011/0202889 A1 | 8/2011 | Ludwig |
| 2011/0202934 A1 | 8/2011 | Ludwig |
| 2011/0260998 A1 | 10/2011 | Ludwig |
| 2011/0261049 A1 | 10/2011 | Cardno |
| 2011/0285648 A1 | 11/2011 | Simon et al. |
| 2012/0007821 A1 | 1/2012 | Zaliva |
| 2012/0011438 A1* | 1/2012 | Kim ............ G06F 1/1626 715/702 |
| 2012/0034978 A1 | 2/2012 | Lim |
| 2012/0056846 A1 | 3/2012 | Zaliva |
| 2012/0194461 A1 | 4/2012 | Lim |
| 2012/0108323 A1* | 5/2012 | Kelly et al. ........ 463/26 |
| 2012/0192119 A1 | 7/2012 | Zaliva |
| 2012/0194462 A1 | 8/2012 | Lim |
| 2012/0195522 A1 | 8/2012 | Ludwig |
| 2012/0223903 A1 | 9/2012 | Ludwig |
| 2012/0235940 A1 | 9/2012 | Ludwig |
| 2012/0262401 A1 | 10/2012 | Rofougaran |
| 2012/0280927 A1 | 11/2012 | Ludwig |
| 2012/0280928 A1 | 11/2012 | Ludwig |
| 2012/0317521 A1 | 12/2012 | Ludwig |
| 2013/0009896 A1 | 1/2013 | Zaliva |
| 2013/0038554 A1 | 2/2013 | West |

OTHER PUBLICATIONS

Moog, Robert A. The Human Finger—A Versatile Electronic Music Instrument Component, Audio Engineering Society Preprint, 1977, New York, NY, USA.

Johnson, Colin "Image sensor tracks moving objects in hardware", Electronic Engineering Times, Apr. 5, 1999.

Kaoss pad dynamic effect/controller, Korg Proview Users' magazine Summer 1999.

Leiberman, David Touch screens extend grasp Into consumer realm Electronic Engineering Times, Feb. 8, 1999.

"Lim, Agrawal, and Nekludova ""A Fast Algorithm for Labelling Connected Components in Image Arrays"", Technical Report Series, No. NA86-2, Thinking Machines Corp., 1986 (rev. 1987),Cambridge, Mass., USA.".

Pennywitt, Kirk "Robotic Tactile Sensing," Byte, Jan. 1986.

Review of KORG X-230 Drum (later called Wave Drum), Electronic Musician, Apr. 1994.

Rich, Robert "Buchla Lightning MIDI Controller", Electronic Musician, Oct. 1991.

Rich, Robert "Buchla Thunder", Electronic Musician, Aug. 1990.

Dario P. and Derossi D. "Tactile sensors and the gripping challenge," IEEE Spectrum, vol. 5, No. 22, pp. 46-52, Aug. 1985.

Snell, John M. "Sensors for Playing Computer Music with Expression", Proceedings of the Intl. Computer Music Conf. at Eastman, 1983.

Verner J. Artif Starr Switch Company Ztar 624-D, Electronic Musician, Nov. 1994.

Lippold Haken, "An Indiscrete Music Keyboard," Computer Music Journal, Spring 1998, pp. 30-48.

Moyle, Michael, et al. "A Flick in the Right Direction: A Case Study of Gestural Input." Conferences in Research and Practice in Information Technology, vol. 18, Jan. 2005; New Zealand.

Dulberg, Martin S., et al. "An Imprecise Mouse Gesture for the Fast Activation of Controls." IOS Press, Aug. 1999.

USPTO Notice of Allowance dated Mar. 20, 2012 issued in U.S. Appl. No. 12/724,413, filed Mar. 15, 2010.

USPTO Notice of Allowance dated Jan. 10, 2008 issued in U.S. Appl. No. 10/683,914, filed Oct. 10, 2003.

USPTO Notice of Allowance dated Nov. 9, 2012 issued in U.S. Appl. No. 12/502,230, filed Jul. 13, 2009.

USPTO Notice of Allowance dated Mar. 12, 2012 issued in U.S. Appl. No. 12/511,930, filed Jul. 29, 2009.

USPTO Notice of Allowance dated Feb. 1, 2013 issued in U.S. Appl. No. 13/441,842, filed Apr. 7, 2012.

USPTO Notice of Allowance dated Feb. 22, 2013 issued in U.S. Appl. No. 13/442,815, filed Apr. 9, 2012.

USPTO Notice of Allowance dated Dec. 24, 2002 issued in U.S. Appl. No. 09/812,870, filed Mar. 19, 2001.

Hernandez-Leon, R., "Classifying using Specific Rules with High Confidence" IEEE Nov. 2010.

Fang, Yuguang, et al, "Dynamics of a Winner-Take-All Neural Network" Neural Networks vol. 9, No. 7, pp. 1141-1154, Oct. 1996.

USPTO Notice of Allowance dated Feb. 19, 2013 issued in U.S. Appl. No. 13/442,806, filed Apr. 9, 2012.

Moto, "DIY Touchscreen Analysis,"http://labs.moto.com/diy-touchscreen-analysis/, Jul. 15, 2010.

Wilson, Tracy, "How the iPhone Works," http://electronics.howstuffworks.com/iphone2.htm, Jan. 8, 2011.

Walker Geoff, "Touch and the Apple iPhone," http://www.veritasetvisus.com/VVTP-12,%20Walker.pdf, Feb. 2007, viewed May 12, 2013.

Multi-Touch Sensing through LED Matrix Displays (video), "http://cs.nyu.edu/~jhan/ledtouch/index.html," Feb. 18, 2011.

"Roberts Cross," http://en.wikipedia.org/wiki/Roberts_Cross, Jul. 20, 2010, visited Feb. 28, 2011.

"Sobel Operator," http://en.wikipedia.org/wiki/Sobel_operator, Mar. 12, 2010, visited Feb. 28, 2011.

"Prewitt," http://en.wikipedia.org/wiki/Prewitt, Mar. 15, 2010, visited Feb. 28, 2011.

"Coefficient of variation," http://en.wikipedia.org/wiki/Coefficient_of_variation, Feb. 15, 2010, visited Feb. 28, 2011.

(56) References Cited

OTHER PUBLICATIONS

"Canny edge detector," http://en.wikipedia.org/wiki/Canny_edge_detector, Mar. 5, 2010, visited Feb. 28, 2011.
"Polynomial regression," http://en.wikipedia.org/wiki/Polynomial_regression, Jul. 24, 2010, visited Feb. 28, 2011.
Pilu,M., Fitzgibbon,A., Fisher, R., "Training PDMs on models: The Case of Deformable Superellipses," Proceedings of the 7th British Machine Vision Conference, Edinburgh, Scotland, 1996, pp. 373-382, https://docs.google.com/viewera=v&pid=explorer&chrome=true&srcid=0BxWzm3JBPnPmNDI1MDIxZGUtNGZhZi00NzJhLWFhZDMtNTJmYmRiMWYyMjBh&authkey=CPeVx4wO&hl=en, visited Feb. 28, 2011 and May 12, 2013.
Osian, M., Tuytelaars, T., Van Gool, L., Leuven, K., "Fitting Superellipses to Incomplete Contours," IEEE Computer Society Conference on Computer Vision and Pattern Recognition Workshops (CVPRW '04), Jun. 2004.
"Hough transform," http://en.wikipedia.org/wiki/Hough_transform, Feb. 13, 2010, visited Feb. 28, 2011.
"Tactile Pressure Measurement, Pressure Mapping Systems, and Force Sensors and Measurement Systems," http://www.tekscan.com, Feb. 3, 2011.
"Sensor Products LLC—Tactile Surface Pressure and Force Sensors," Oct. 26, 2006, http://www.sensorprod.com.
"Pressure Profile Systems," Jan. 29, 2011, http://www.pressureprofile.com.
"Xsensor Technology Corporation," Feb. 7, 2011, http://www.xsensor.com.
"Balda AG," Feb. 26, 2011, http://www.balda.de.
"Cypress Semiconductor," Feb. 28, 2011, http://www.cypress.com.
"Synaptics," Jan. 28, 2011, http://www.synaptics.com.
USPTO Notice of Allowance dated May 8, 2013 issued in U.S. Appl. No. 12/541,948, filed Aug. 15, 2009.

* cited by examiner

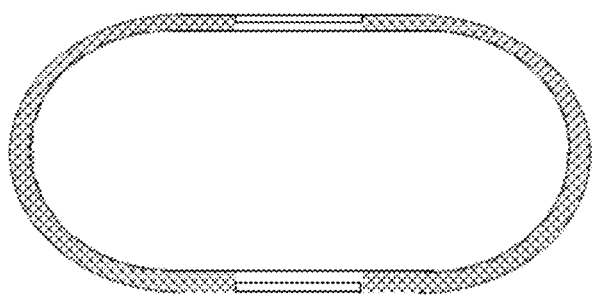
Figure 5a
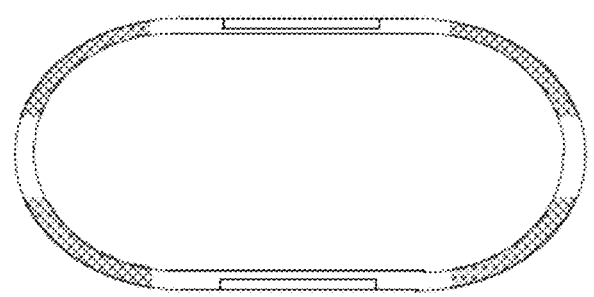
Figure 5b
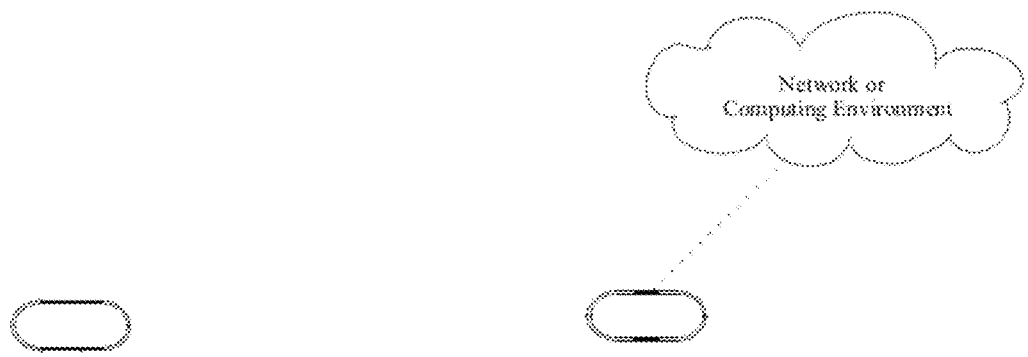
Figure 6a
Figure 6b

HIGH-DIMENSIONAL TOUCHPAD GAME CONTROLLER WITH MULTIPLE USAGE AND NETWORKING MODALITIES

CROSS-REFERENCE TO RELATED APPLICATIONS

Pursuant to 35 U.S.C. § 119(e), this application claims benefit of priority from Provisional U.S. Patent application Ser. No. 61/371,153, received at the U.S. Patent Office on Aug. 5, 2010, the contents of which are incorporated by reference.

COPYRIGHT & TRADEMARK NOTICES

A portion of the disclosure of this patent document may contain material, which is subject to copyright protection. Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

BACKGROUND OF THE INVENTION

Although portable devices are becoming very popular, users still rely on devices that are not portable for a variety of reasons—for example most inexpensive portable devices have limited capacity of processor or storage. Devices with lack of mobility can be compensated for by additional features or additional types of devices that provide access to associated systems or networks. An important example of these, and subject of the present invention, is game consoles.

WiFi and other types of networking has become available in most urban areas, and there are broad ranges of devices that enable the users to easily connect among devices within homes via various types of networking. Additionally, electronic games for social networks and massively multiplayer online (MMO) games are a rapidly growing trend in gaming industry. Further, digital distribution and downloadable content are also becoming a trend in gaming industry. Accordingly, staying connected to the internet or other network has become increasingly essential in gaming.

Further, it is noted that during the last decade video games have become more interactive. Older games utilized button-pressing sequences to simulate more complicated inputs and motions (such as gestures). Because of the fact that such button-pressing sequences are often very complicated, some games have limited audience of users. As gaming consoles devised and include user-operated controls that are easier to use, such game consoles have increasingly attracted users that are not experienced gamers. For example, Nintendo's Wii has variety of games the whole family can play, and the targeted age of users are definitely of wider range compared to some years ago.

The popularity of the Apple™ iPhone™ and subsequent smartphones, PDAs, and other handheld mobile devices with touch interfaces has lead to interest and demand for games that use touch-based and touch-gesture user interfaces. To date the touch capabilities have been somewhat limited. Some newer game controllers and portable game consoles comprise touch-screens, but these typically only offer the X-Y position tracking capabilities of traditional mice or simple flinger-flick gestures.

The High Dimensional Touch Parameter ("HDTP") touch-pad and touch-screen technologies as taught in U.S. Pat. No. 6,570,078, pending U.S. patent application Ser. No. 12/418,605, pending U.S. patent application Ser. No. 11/761,978, and many other related pending U.S. patent applications provide a wide range of touch-based user interface capabilities—including 3D and 6D interactions, advanced multi-touch, rich information flux, rich metaphors, multi-dimensional extensions to hyperlinks (for example as taught in pending U.S. patent application Ser. No. 13/026,248), and tactile grammars—many of which are very well suited for interactive control of gaming systems. Additionally, HDTP touch-pad and touch-screen technologies can be readily implemented in small, handheld devices. Further as to this, as taught in pending U.S. patent application Ser. Nos. 12/418,605 and 61/506,634, medium and high resolutions HDTP touch-screen technologies can be implemented using multiplexed OLED displays or transparent OLED overlays atop LCD displays so that capacitive sensing overlays and associated RF electronics are not required. In such embodiments, the capture and tracking software for gestures and parameters can be implemented in part or entirely in GPU processors, display driver software, and other computational elements within a device.

Two previous pending U.S. Patent Applications by the present inventor—U.S. patent application Ser. Nos. 12/502,230 and 12/511,930—share a specification that teaches aspects of game-based applications of HDTP technologies, for example as implemented on a computer (or as implemented on a hand-held device; see FIG. 1*f* therein).

The present invention provides for the incorporation of selected HDTP features as advantageous for additional embodiments, product, or applications of a game controller, device acting as a game controller, or other related technologies. The present invention additionally pertains to various embodiments of advanced game controllers that include an HDTP touch-pad or touch-screen.

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In an embodiment, inventive systems and methods of the invention comprise the incorporation of selected HDTP features as advantageous for additional embodiments, product, or applications of a game controller, device acting as a game controller, or other related technologies.

In another aspect of the invention, a game controller comprises touch-based sensor that is used as a sensor for a HDTP user interface.

In another aspect of the invention, a game controller comprises capacitive touch sensor that is used as a sensor for a HDTP user interface.

In an aspect of the invention, a game controller comprises an OLED display that is used as a touch-based user interface.

In another aspect of the invention, a game controller comprises an OLED display that is used as a sensor for a HDTP user interface.

In another aspect of the invention, a game controller comprises video camera that is used as a sensor for a HDTP user interface.

In another aspect of the invention, a game controller comprises video camera that is used as a sensor for gesture sensing.

In another aspect of the invention, a game controller comprises an HDTP user interface and a joystick.

In another aspect of the invention, a game controller comprises support for a multiple-dimensional hypermedia object.

In another aspect of the invention, a game controller comprises support for a multiple-dimensional hyperlink.

In an embodiment, the invention comprises a High Dimensional Touch Parameter (HDTP) touch capability that can selectively function, as desired by the user, as one or more of a game controller that connects to a game console via network connections, an independent portable/mobile game device with limited but sufficient capacity of processor/memory, a controller for a game console connected remotely through the internet and or a storage device/media player that can store gaming history, personal information, or media files. In an embodiment the device comprises at least one processor for executing at least one algorithm, the algorithm including at least a game, at least one touch sensor providing real-time tactile information to at least one algorithm, the algorithm implementing at least on HDTP function, and at least one networking element configured to network the device to at least the internet.

In an embodiment the invention comprises a device that can selectively function, as desired by the user, as one or more of:
- a game controller device that connects to a game console via wireless connections;
- a game controller device that connects to a game console via wired connections;
- an independent portable/mobile game device with limited but sufficient capacity of processor/memory;
- a controller for a game console connected remotely through the internet;
- a storage device/media player that can store gaming history, personal information, or media files.

In an embodiment the invention comprises a device that can selectively function, as desired by the user, as one or more of:
- a game controller device that connects to a game console via wireless connections;
- a game controller device that connects to a game console via wired connections;
- an independent portable/mobile game device with limited but sufficient capacity of processor/memory;
- a controller for a game console connected remotely through the internet.

In an embodiment the invention comprises a device that can selectively function, as desired by the user, as one or more of:
- a game controller device that connects to a game console via wireless connections;
- a game controller device that connects to a game console via wired connections;
- an independent portable/mobile game device with limited but sufficient capacity of processor/memory.

In an embodiment the invention comprises a device that can selectively function, as desired by the user, as one or more of:
- an independent portable/mobile game device with limited but sufficient capacity of processor/memory;
- a storage device/media player that can store gaming history, personal information, or media files.

These and other embodiments will also become readily apparent to those skilled in the art from the following detailed description of the embodiments having reference to the attached figures, the invention not being limited to any particular embodiment disclosed.

BRIEF DESCRIPTION OF THE DRAWINGS

The above and other aspects, features and advantages of the present invention will become more apparent upon consideration of the following description of preferred embodiments taken in conjunction with the accompanying drawing figures.

FIGS. 5a and 5b illustrates physical configuration of the embodiment of the invention where there are touch sensor regions along the edge of the device.

FIG. 6a depicts an exemplary controller (or portable gaming console) as a standalone device.

FIG. 6b depicts an exemplary controller (or portable gaming console) connected to the network or computing environment.

DETAILED DESCRIPTION OF THE PREFERRED EMBODIMENTS

Figure 1A:
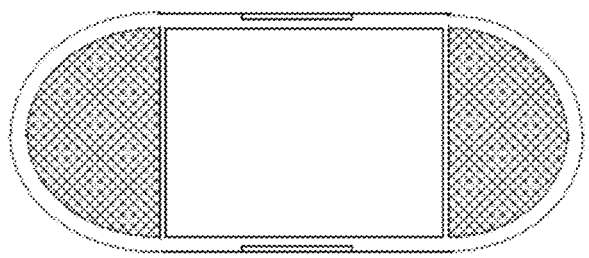
FIGS. 1a and 1b illustrate physical configuration of the embodiment of the invention which comprises of a screen on the center of the front and touch sensor regions on left and right end of the device both on the front and the back.

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

In the following description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention.

Mobile and Non-Mobile Devices

Although portable devices are becoming very popular, users still rely on devices that are not portable for a variety of reasons—for example most inexpensive portable devices have limited capacity of processor or storage. Devices with lack of mobility can be compensated for by additional features or additional types of devices that provide access to associated systems or networks. An important example of these, and the subject of the present invention, are game consoles.

Networking of Game Controllers

WiFi and other types of networking has become available in most urban areas, and there are broad ranges of devices that enable the users to easily connect among devices within homes via various types of networking. Additionally, electronic games for social networks and massively multiplayer online (MMO) games are a rapidly growing trend in gaming industry. Further, digital distribution and downloadable content are also becoming a trend in gaming industry. Accordingly, staying connected to the internet or other network has become increasingly essential in gaming.

User Interface Evolution in Game Controllers

Further, it is noted that during the last decade video games have become more interactive. Older games utilized button-pressing sequences to simulate more complicated inputs and motions (such as gestures). Because of the fact that such button-pressing sequences are often very complicated, some games have limited audience of users. As gaming consoles develop and include user-operated controls that are easier to use, such game consoles have increasingly attracted users that are not experienced gamers. For example, Nintendo's Wii has a variety of games the whole family can play, and the targeted age of users are definitely of wider range compared to some years ago.

Touch-Based User Interfaces in Game Controllers

The popularity of the Apple™ iPhone™ and subsequent smartphones, PDAs, and other handheld mobile devices with touch interfaces has lead to interest and demand for games that use touch-based and touch-gesture user interfaces. To date the touch capabilities have been somewhat limited. Some newer game controllers and portable game consoles comprise touch-screens, but these typically only offer the X-Y position tracking capabilities of traditional mice or simple flinger-flick gestures.

High Dimensional Touch Parameter ("HDTP") Touch-Pad and Touch-Screen Technologies and its Use in Game Controllers The High Dimensional Touch Parameter ("HDTP") touch-pad and touch-screen technologies as taught in U.S. Pat. No. 6,570,078, pending U.S. patent application Ser. No. 12/418,605, pending U.S. patent application Ser. No. 11/761,978, and many other related pending U.S. patent applications provide a wide range of touch-based user interface capabilities. These include vast ranges of control by combinations of additional parameters derived from touch by the human hand, including a number of natural 3D capabilities, for example:

3D and 6D interactions;
advanced multi-touch;
use both hands (for example, when the invention is oriented horizontally) or one hand (when oriented vertically);
rich information flux;
rich frameworks for a wide variety of metaphors;
multi-dimensional extensions to hypermedia objects including hyperlinks and rollovers (for example as taught in pending U.S. patent application Ser. No. 13/026,248);
tactile grammars.

Additionally, HDTP touch-pad and touch-screen technologies can be readily implemented in small, handheld devices in various ways. As taught in pending U.S. patent application Ser. Nos. 12/418,605 and 61/506,634, medium and high resolutions HDTP touch-screen technologies can be implemented using multiplexed OLED displays or transparent OLED overlays atop LCD displays so that capacitive sensing overlays and associated RF electronics are not required. In such embodiments, the capture and tracking software for gestures and parameters can be implemented in part or entirely in GPU processors, display driver software, and other computational elements within a device. Also as taught in U.S. Pat. No. 6,570,078 and pending U.S. patent application Ser. No. 12/418,605, video cameras can also be used to implement HDTP capabilities and extensions of them.

Use of HDTP Touch-Pad and Touch-Screen Technologies in Game Controllers

The vast ranges of control by combinations of additional parameters derived from touch by the human hand, including its extensive natural 3D capabilities, metaphors, grammars, and advanced hyperlinks are very well suited for interactive control of gaming systems.

Two previous pending U.S. Patent Applications by the present inventor—U.S. patent application Ser. Nos. 12/502,230 and 12/511,930—share a specification that teaches aspects of game-based applications of HDTP technologies, for example as implemented on a computer (or as implemented on a hand-held device; see FIG. 1*f* therein).

The present invention provides for the incorporation of selected HDTP features as advantageous for additional embodiments, product, or applications of a game controller, device acting as a game controller, or other related technologies. The present invention additionally pertains to various embodiments of advanced game controllers that include an HDTP touch-pad or touch-screen.

Use of HDTP 3D Capabilities

As newer games heavily rely on interactive 3D features more and more, these additional parameters provided by the HDTP can be more useful as they can produce controls using natural metaphors. The need for multiple buttons and directional pad/stick is eliminated by the HDTP. Controls that previously require complicated sequence of arrow keys and buttons can easily be implemented by combination of parameters. Users can navigate through the setup menus and control options in a game with the HDTP. A joystick or a directional control stick, which is a main feature of most game controllers, can be replaced with having the HDTP along the edge of the controller: if a user wants to move an object to a desired direction, the user can place one or more finger(s) in the corresponding side of the touch-pad, or a touch-pad can be placed on the top surface of the joystick.

HDTP Sensors

In an embodiment, the invention can comprise (or be comprised within) a device comprising of any combination of two or more of the following:

- A screen that also functions as a touch-pad or touch-screen (for example as taught in pending U.S. patent application Ser. Nos. 12/418,605 and 61/506,634, using capacitive, pressure, or LED/OLD sensing technologies);
- One or more touch sensor(s) provided in a region along the edge all around or at least in areas where both index fingers and both thumbs can sit comfortably for simultaneous input;
- One or more touch sensor(s) provided in a region on both left and right end;
- One or more touch sensor(s) provided in a region on the back of either/both left and right end;
- One or more low-profile directional pad(s)/stick(s) configured in the center of the bottom and/or the center of the top edge;
- One or more built-in camera(s) for implementing HDTP functions, gesture recognition, and/or machine vision functions.

In an embodiment, the aforementioned touch-pad or touch-screen can be an HDTP touch-pad or touch-screen. A number of exemplary configurations incorporating one or more touch-pads or touch-screens, ordinary, gesture-based, and/or HDTP are now presented.

FIG. 1*a*-5*b* illustrate physical exemplary embodiment of the invention.

Figure 1B:
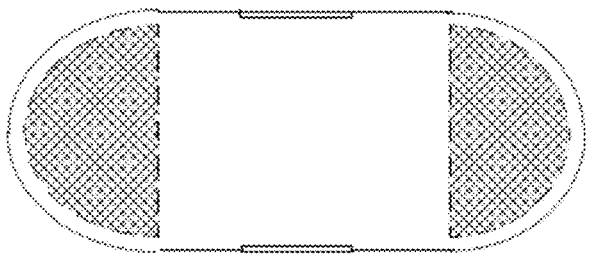

FIGS. 1*a* and 1*b* illustrate physical configuration of the embodiment of the invention which comprises of a screen on the center of the front and touch sensor regions on left and right end of the device both on the front and the back.

Figure 2A:
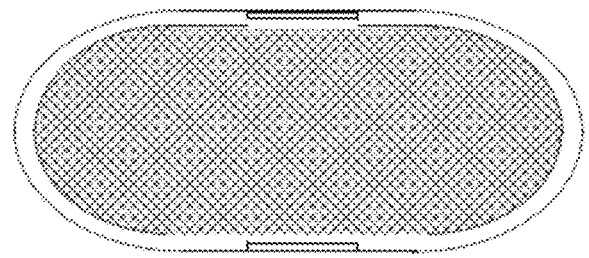
FIGS. 2a and 2b illustrate physical configuration of the embodiment of the invention which comprises of a touch-screen on the front and touch sensor regions on left and right end of the device both on the front and the back.
Figure 2B:
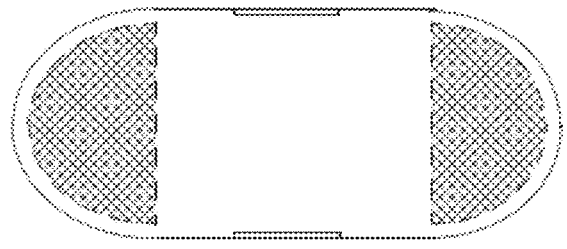

FIGS. 2*a* and 2*b* illustrate physical configuration of the embodiment of the invention which comprises of a touch-screen on the front and touch sensor regions on left and right end of the device both on the front and the back.

Figure 3A:
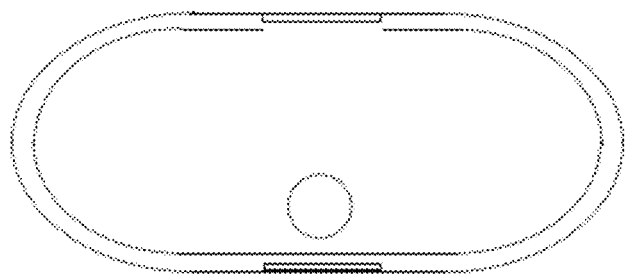
FIG. 3a illustrates physical configuration of the embodiment of the invention which includes a joystick (or a directional stick) on the bottom center of the front.
Figure 3B:
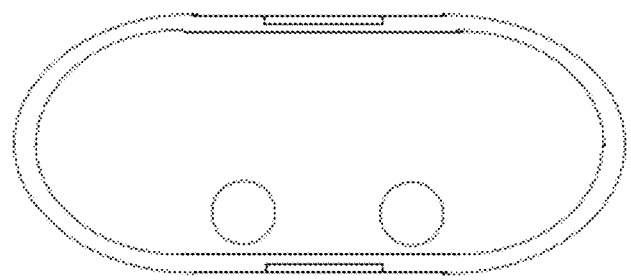
FIG. 3b illustrates physical configuration of the embodiment of the invention which includes two joysticks (or directional sticks) on the bottom center of the front.

The invention provides for the HDTP to be supplemented with additional controllers. For example, FIG. 3*a* illustrates physical configuration of the embodiment of the invention which includes a joystick (or a directional stick) on the bottom center of the front. Similarly, FIG. 3*b* illustrates physical configuration of the embodiment of the invention which includes two joysticks (or directional sticks) on the bottom center of the front.

Figure 4A:
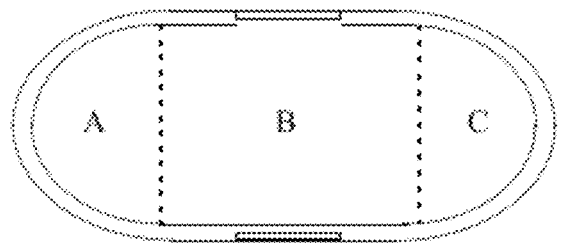
FIG. 4a-4c illustrates physical configuration of the embodiment of the invention where the touch sensor region on the front is partitioned into multiple parts.
Figure 4B:
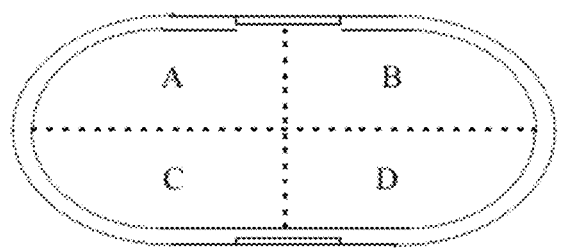
Figure 4C:
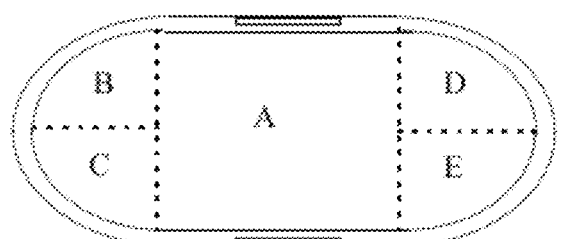

FIG. 4*a*-4*c* illustrates physical configuration of the embodiment of the invention where a touch sensor region is implemented on the front of the device is partitioned into multiple parts.

FIGS. 5*a* and 5*b* illustrates physical configuration of the embodiment of the invention where there is at least one touch sensor region along the edge of the device.

Networking

Various embodiments of the invention can support a number of operating modalities and networking arrangements with the internet, game consoles, games servers, etc.

FIG. 6*a*-6*f* illustrate exemplary usage modality and/or networking embodiments provided for by the invention.

Figure 6C:
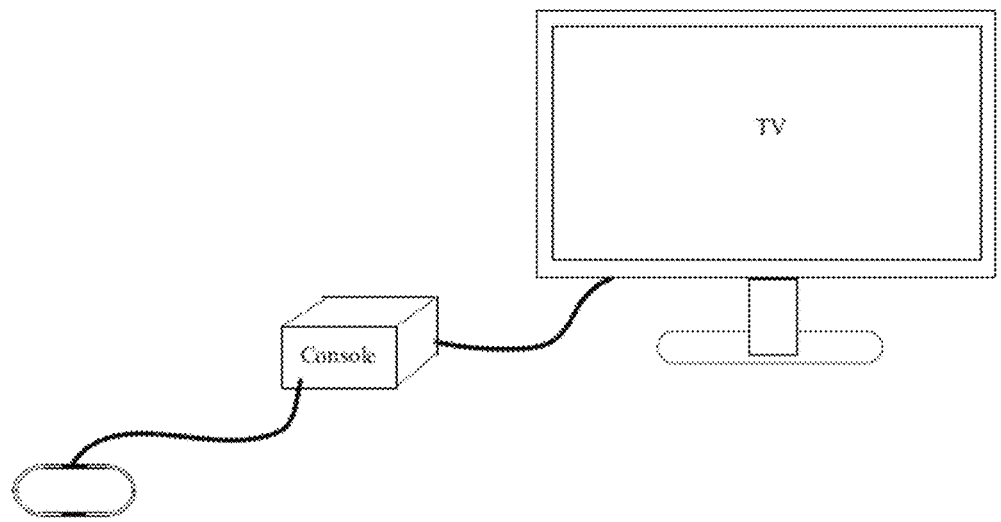
FIG. 6c depicts an exemplary controller connected with wire to the console, which is connected to the TV or display.
Figure 6D:
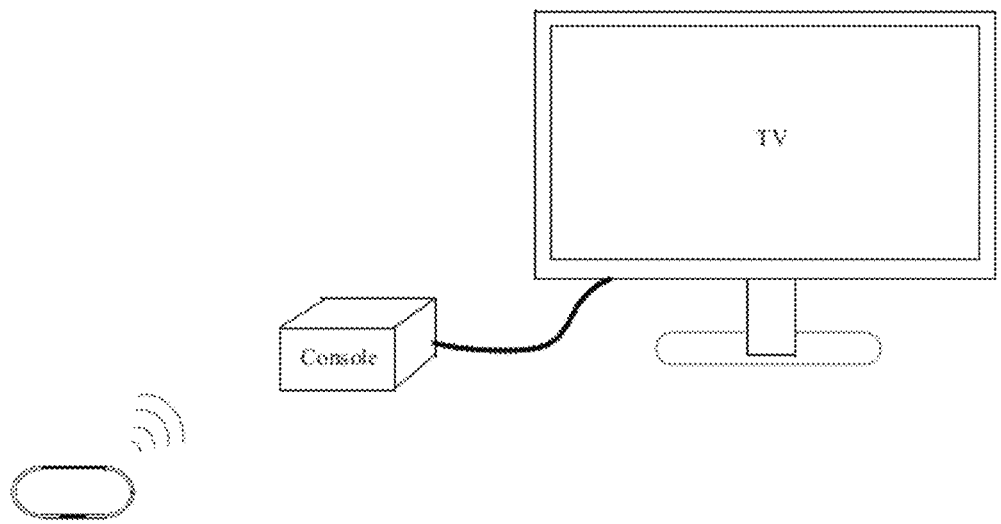
FIG. 6d depicts an exemplary controller connected wirelessly the console, which is connected to the TV or display. Such wireless connection includes infrared, Bluetooth, WiFi, etc.
Figure 6E:
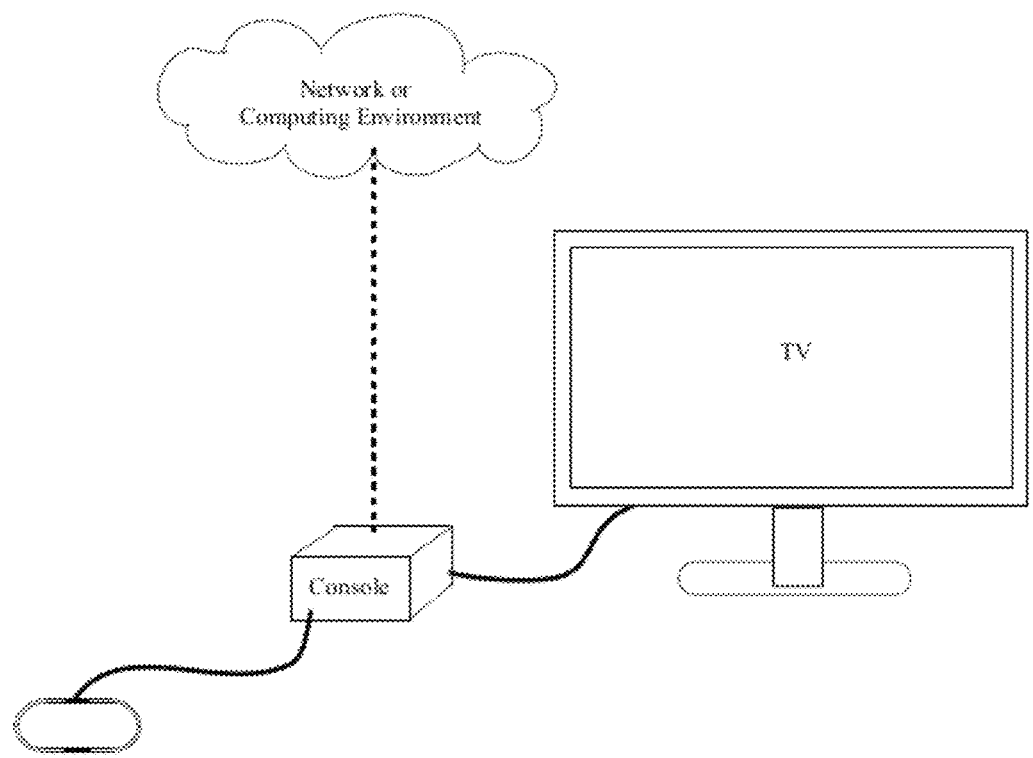
FIG. 6e depicts an exemplary controller wired to the console (connected to the TV or display) which is connected to the network or computing environment.
Figure 6F:
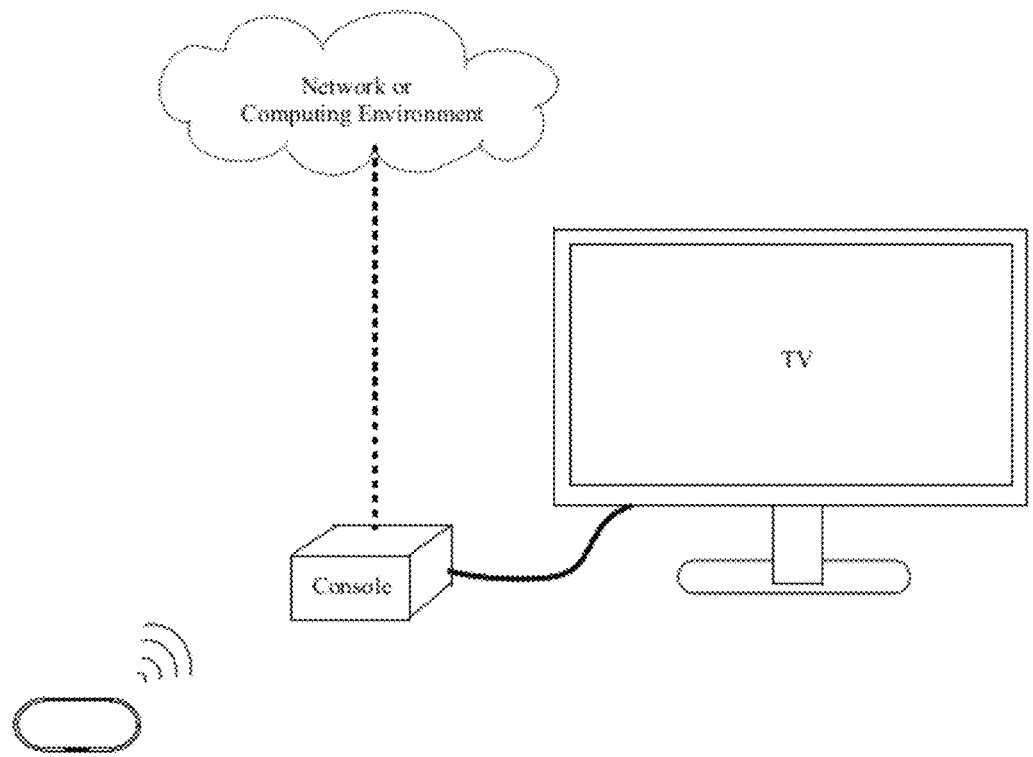
FIG. 6f depicts an exemplary controller connected wirelessly the console (connected to the TV or display) which is connected to the network or computing environment.

FIG. 6*a* represents the controller (or portable gaming console) as a standalone device. FIG. 6*b* represents the controller (or portable gaming console) connected to the network or computing environment. In FIG. 6*c*, the controller is connected with wire to the console, which is connected to the TV or display. In FIG. 6*d*, the controller is connected wirelessly the console, which is connected to the TV or display. Such wireless connection includes infrared, Bluetooth, LAN, WAN, WAP, etc. In FIG. 6*e*, the controller is wired to the console (connected to the TV or display) which is connected to the network or computing environment. In FIG. 6*f*, the controller is connected wirelessly the console (connected to the TV or display) which is connected to the network or computing environment.

Figure 7A:
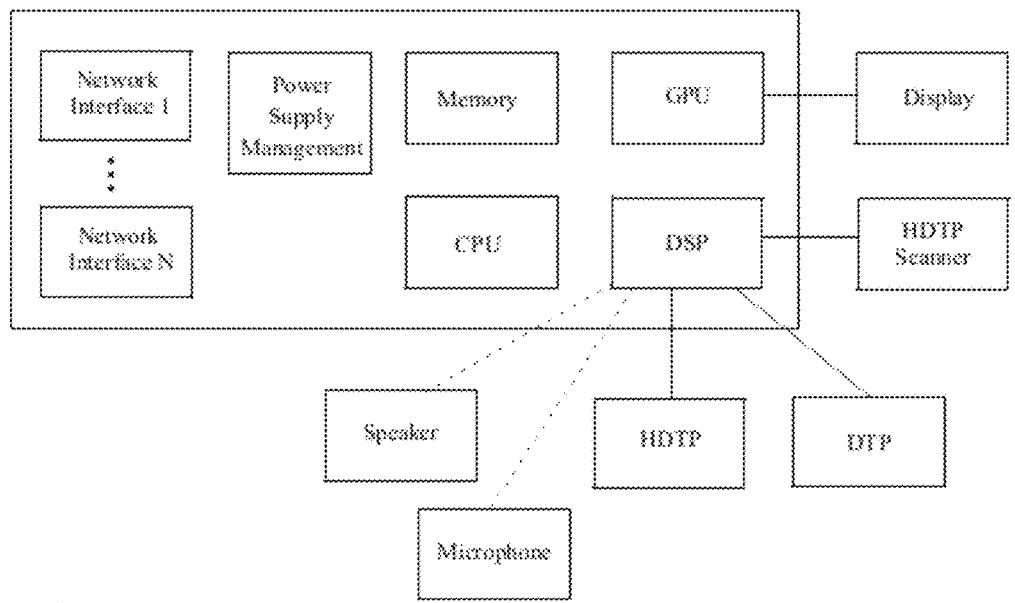
FIGS. 7a and 7b describe the possible embodiments of the architecture of the invention.
Figure 7B:
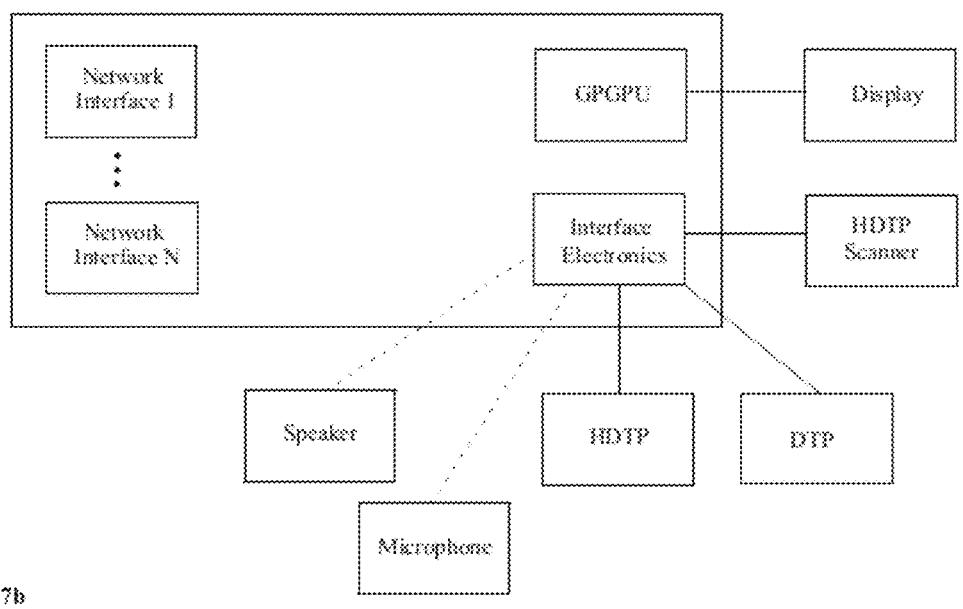

FIGS. 7*a* and 7*b* describe the possible embodiments of the internal architecture of the invention. FIG. 7*a* depicts an exemplary embodiment comprising one or more network interface(s), memory, CPU, GPU, and DSP. FIG. 7*b* illustrates a different an exemplary embodiment. The need for memory and CPU is eliminated by having a GPGPU (General Purpose GPU). General purpose computing, as well as graphic rendering, is delegated to GPGPU. In the above, the exemplary depicted audio features (speaker, microphone) can be included or omitted as can be advantageous.

Figure 8A:
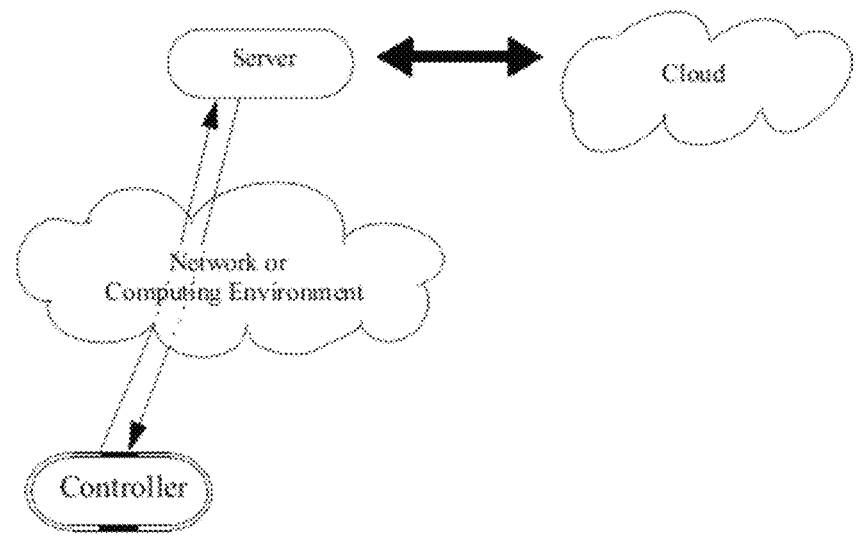
FIG. 8a illustrates an exemplary arrangement wherein a game controller is connected to the server via network for the purpose of having the server handle computations, data or database, or combinations of them.
Figure 8B:
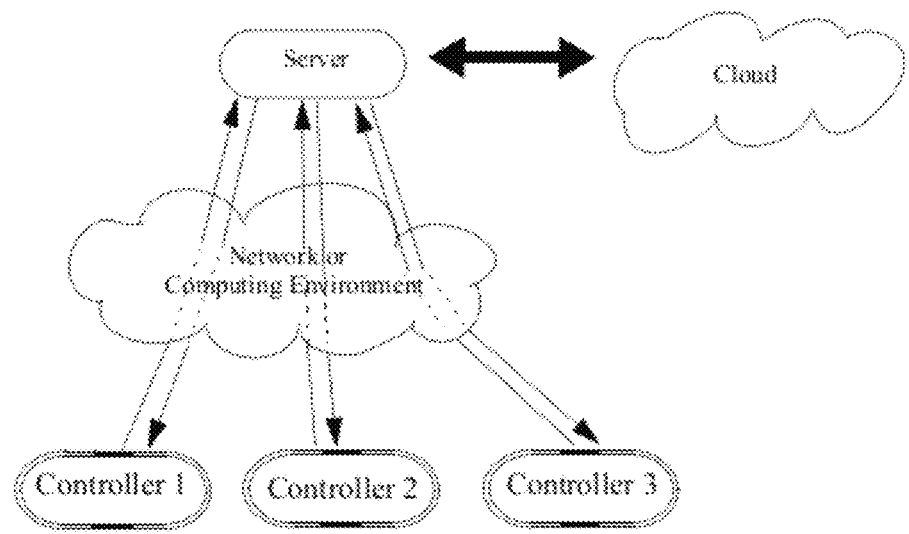
FIG. 8b illustrates an exemplary arrangement wherein multiple game controllers are connected to one server through network.
Figure 8C:
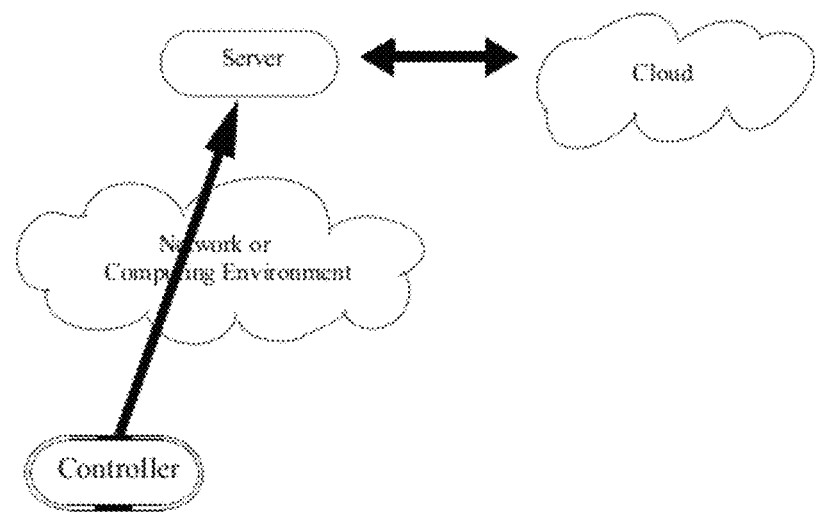
FIG. 8c illustrates an exemplary arrangement wherein a controller can control the server through the network or the computing environment.
Figure 8D:
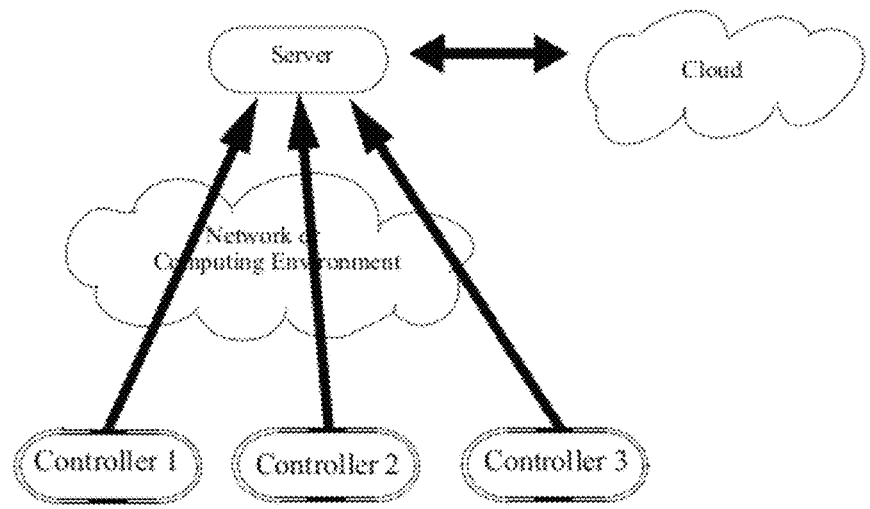
FIG. 8d illustrates an exemplary arrangement wherein multiple controllers can control the server through the network or the computing environment.

FIG. 8*a* illustrates an exemplary arrangement wherein a game controller is connected to the server via network for the purpose of having the server handle computations, data or database, or combinations of them. FIG. 8*b* illustrates an exemplary arrangement wherein multiple game controllers are connected to one server through network. All the controllers are connected only through the server; no direct access among one controller to another is available. This is referred to as "star" topology or social network. FIG. 8*c* illustrates an exemplary arrangement wherein a controller can control the server through the network or the computing environment. FIG. 8*d* illustrates an exemplary arrangement wherein multiple controllers can control the server through the network or the computing environment.

Figure 9A:
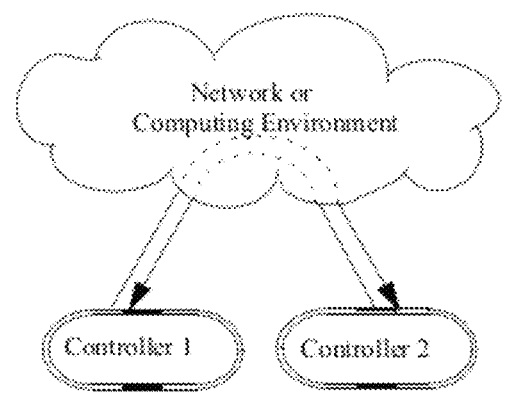
FIG. 9a illustrates an exemplary arrangement wherein two game controllers are connected through network.
Figure 9B:
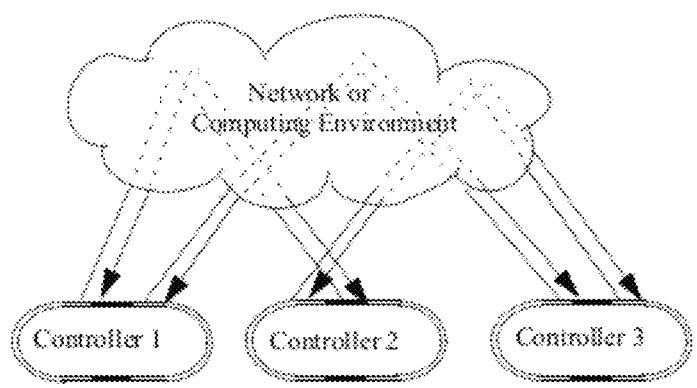
FIG. 9b illustrates how three game controllers are connected to one another through network.

FIG. 9a illustrates an exemplary arrangement wherein two game controllers are connected through network. FIG. 9b illustrates an exemplary arrangement wherein three game controllers are connected to one another through network. This connection represents a "Full Mesh" top-every controller is connected to every other controller.

Figure 9C:
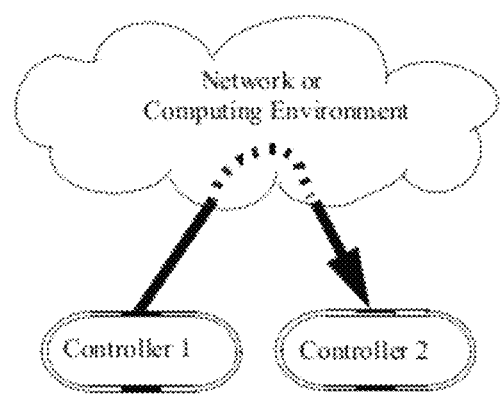
FIG. 9c illustrates an exemplary arrangement wherein a controller can control another controller that is connected to the same network or the computing environment.
Figure 9D:
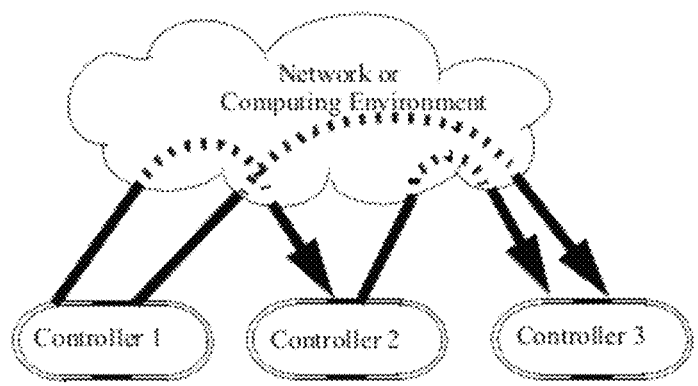
FIG. 9d illustrates an exemplary arrangement wherein one controller can control another controller connected on the same network or the computing environment.

FIG. 9c illustrates an exemplary arrangement wherein a controller can control another controller that is connected to the same network or the computing environment. FIG. 9d illustrates an exemplary arrangement wherein one controller can control another controller connected on the same network or the computing environment.

Exemplary HDTP Usage Scenarios

Exemplary HDTP parameters (or combinations of parameters) usage scenarios are now considered.

In sporting games where a graphically rendered object is thrown or hit, rotating a finger can be used to adjust the direction, and more or less pressure to adjust the intensity of throwing/hitting. Other variations are clear to one skilled in the art and are provided for by the invention.

Figure 10A:
FIG. 10a illustrates an exemplary view from the simulated aircraft when the aircraft is rotated to the left.
Figure 10B:
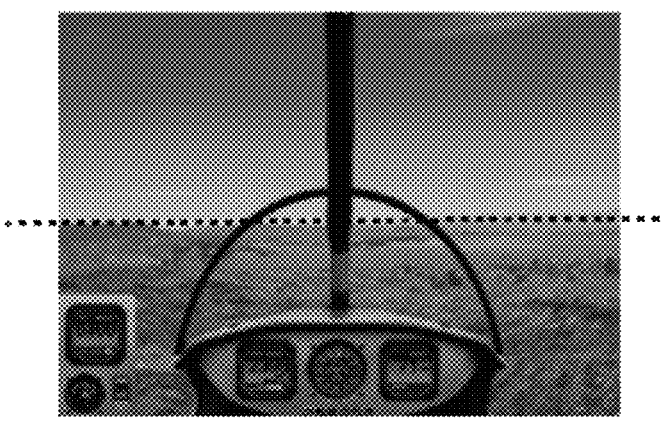
FIG. 10b illustrates an exemplary view from the simulated aircraft when the aircraft is in neutral position.
Figure 10C:
FIG. 10c illustrates an exemplary view from the simulated aircraft when the aircraft is rotated to the right.
Figure 11A:
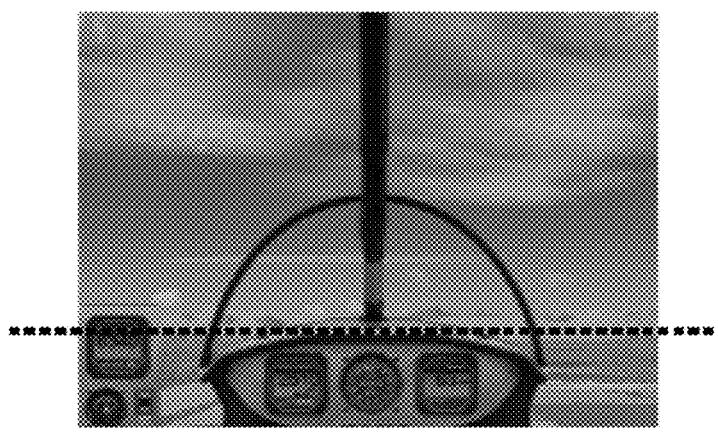
FIG. 11a illustrates an exemplary view from the simulated aircraft when the aircraft is slanted upward.
Figure 11B:
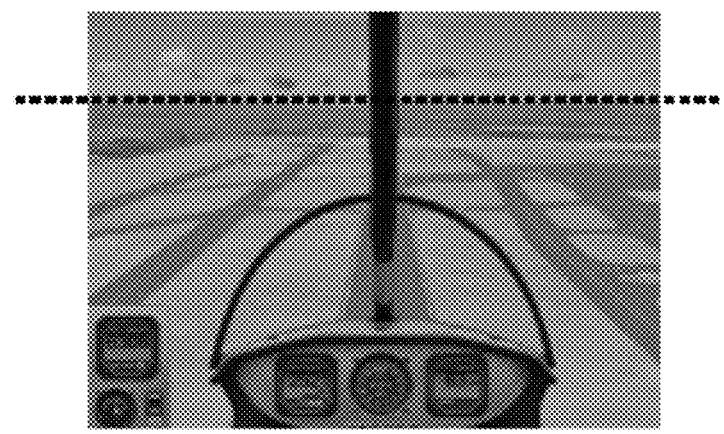
FIG. 11b illustrates an exemplary view from the simulated aircraft when the aircraft is in neutral position.
Figure 11C:
FIG. 11c illustrates an exemplary view from the simulated aircraft when the aircraft is slanted downward.
Figure 12A:
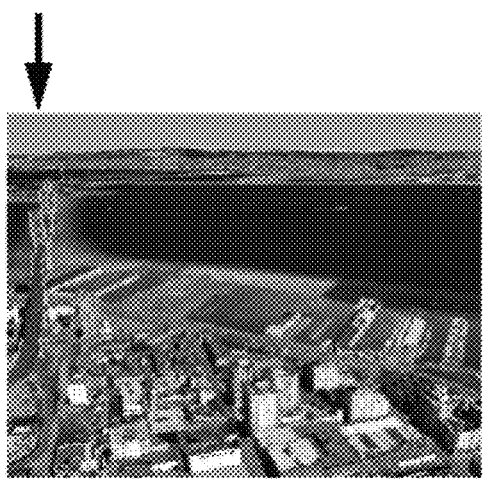
FIG. 12a illustrates an exemplary view from the simulated aircraft when the aircraft is rotated clockwise.
Figure 12B:
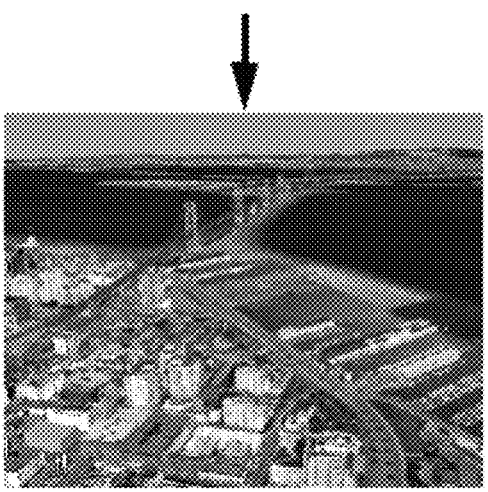
FIG. 12b illustrates an exemplary view from the simulated aircraft when the aircraft is in neutral position.
Figure 12C:
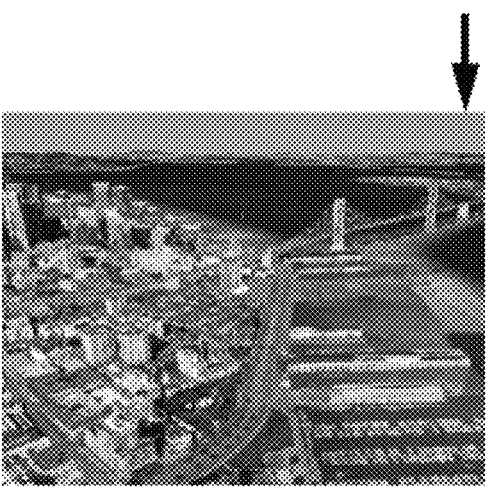
FIG. 12c illustrates an exemplary view from the simulated aircraft when the aircraft is rotated counterclockwise.

As taught in pending U.S. patent applications U.S. Ser. No. 12/502,230 and U.S. Ser. No. 12/511,930, in a flight simulator game, the user can control the direction of the movement by rolling, pitching, or rotating the finger, these sensed by HDTP touch-screen or touch sensor technology. For example, a user can control horizontal orientation of the aircraft by rolling the finger; roll the finger to the left to have the aircraft roll counter-clockwise and roll the finger to the right to have the aircraft roll clockwise. FIG. 10a illustrates an exemplary view from the simulated aircraft when the aircraft is rotated to the left, and FIG. 10c illustrates an exemplary view from the simulated aircraft when the aircraft is rotated to the right. FIG. 10b illustrates an exemplary view from the simulated aircraft when the aircraft is in neutral position. FIG. 11a illustrates an exemplary view from the simulated aircraft when the aircraft is slanted upward, and FIG. 11c illustrates an exemplary view from the simulated aircraft when the aircraft is slanted downward. FIG. 11b illustrates an exemplary view from the simulated aircraft when the aircraft is in neutral position. FIG. 12a illustrates an exemplary view from the simulated aircraft when the aircraft is rotated clockwise, and FIG. 12c illustrates an exemplary view from the simulated aircraft when the aircraft is rotated counterclockwise. FIG. 12b illustrates an exemplary view from the simulated aircraft when the aircraft is in neutral position.

Combinations of more HDTP parameters can implement, emulate, or simulate more complex control actions. For example, the simulated aircraft can be slanted downward while rotated to the left by a finger rotated counterclockwise while being tilted downward. Other variations are clear to one skilled in the art and are provided for by the invention.

Similar controls can be available in vehicle simulation games. Rolling, pitching, and rotating fingers can control steering, braking, and accelerating the vehicles. Other variations are clear to one skilled in the art and are provided for by the invention.

In games where two different major categories of control is required, i.e. combat flight simulations games where the users simulate both flying and combat situations, having touch sensor regions both on front and back side of the controller can be advantageous. As an example, the touch sensor regions on the front can be used for navigating the aircraft, and the touch sensor regions on the back can be used for navigating through submenus for selecting targets, weapons, etc. In another embodiment, the touch sensor regions on the front can be used for actual movement of the aircraft, and the touch sensor regions on the back can be used for manipulating the viewpoint. Other variations are clear to one skilled in the art and are provided for by the invention.

In a 3D puzzle game, the orientation of a 3D object can be manipulated with a finger placed on the touch sensor on the left end of the controller, and the position of a 3D object can be manipulated with a finger placed on the touch sensor on the right end of the controller. Other variations are clear to one skilled in the art and are provided for by the invention.

In a competitive fighting video game, one region of the HDTP can control the arm motions while another region of the HDTP can control the leg motions. Variations on the users' touch can simulate complex punches or kicks. Also, making selections in menus or switching between different modes can be done easily with rolling, pitching, or rotating fingers. Other variations are clear to one skilled in the art and are provided for by the invention. Further, a contiguous touch sensor region can be partitioned into multiple parts, as described in pending U.S. patent application Ser. No. 12/418,605.

In a music game or application, different parts of the HDTP can control different instruments: for example, left hand can play the drums, and right hand can play the guitar. Other variations are clear to one skilled in the art and are provided for by the invention.

In another embodiment, the controller can be composed of a plurality of distinct portions or modules—for example left, center, and right modules—and one or more such portions or modules can be replaced with a module that is longer, shaped differently, or has other variations or differences—for example as may be particularly suited to a particular mode or action of play. Just as the replica guitar used in RockBand™, a module that is longer to replicate frets on a guitar can be used to provide experience that is similar to playing an actual guitar. Other variations are clear to one skilled in the art and are provided for by the invention.

Combinations of parameters can also improve the user experience in construction and management simulation games by providing easier way of making selections in menus or switching between different modes.

With a built-in camera for gesture recognition or machine vision, users can control the object in the game, while the camera detects the user behavior which can be another input for the game.

In an embodiment, the invention uses HDTP functions to implement multi-dimensional extensions to hypermedia objects including hyperlinks and rollovers (for example as taught in pending U.S. patent application Ser. No. 13/026, 248).

Additional Exemplary Aspects and Applications of the Invention

Additional exemplary aspects and applications of the present invention provide for embodiments to be configured as one or more of the following:

- a standalone device, a portable game/media player limited but moderate capacity of processor and memory;
- a portable game/media player connected to the network;
- a game controller connected to the main console with wired connections, which can be connected to the network;
- a game controller connected to the main console with wireless connections, which can be connected to the network;
- a game controller directly connected to the network where a main console is connected to;
- a game controller directed connected to the network for cloud computing network service.

In an embodiment the invention comprises a device that can selectively function, as desired by the user, as one or more of:
- a game controller device that connects to a game console via wireless connections;
- a game controller device that connects to a game console via wired connections;
- an independent portable/mobile game device with limited but sufficient capacity of processor/memory;
- a controller for a game console connected remotely through the internet;
- a storage device/media player that can store gaming history, personal information, or media files.

In an embodiment the invention comprises a device that can selectively function, as desired by the user, as one or more of:
- a game controller device that connects to a game console via wireless connections;
- a game controller device that connects to a game console via wired connections;
- an independent portable/mobile game device with limited but sufficient capacity of processor/memory;
- a controller for a game console connected remotely through the internet.

In an embodiment the invention comprises a device that can selectively function, as desired by the user, as one or more of:
- a game controller device that connects to a game console via wireless connections;
- a game controller device that connects to a game console via wired connections;
- an independent portable/mobile game device with limited but sufficient capacity of processor/memory.

In an embodiment the invention comprises a device that can selectively function, as desired by the user, as one or more of:
- an independent portable/mobile game device with limited but sufficient capacity of processor/memory;
- a storage device/media player that can store gaming history, personal information, or media files.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

While the invention has been described in detail with reference to disclosed embodiments, various modifications within the scope of the invention will be apparent to those of ordinary skill in this technological field. It is to be appreciated that features described with respect to one embodiment typically can be applied to other embodiments.

The invention can be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

Although exemplary embodiments have been provided in detail, various changes, substitutions and alternations could be made thereto without departing from spirit and scope of the disclosed subject matter as defined by the appended claims. Variations described for the embodiments may be realized in any combination desirable for each particular application. Thus particular limitations and embodiment enhancements described herein, which may have particular advantages to a particular application, need not be used for all applications. Also, not all limitations need be implemented in methods, systems, and apparatuses including one or more concepts described with relation to the provided embodiments. Therefore, the invention properly is to be construed with reference to the claims.

The invention claimed is:

1. A game controller device comprising:
a processor for executing an algorithm for controlling a game being executed by a game console;
a High Dimensional Touch Parameter (HDTP) touch surface, the HDTP touch surface for receiving user touch input and generating real-time tactile information, wherein the real-time tactile information is arranged to be processed to generate signals responsive to a multidimensional hypermedia object and HDTP control signals to control the game, and wherein the HDTP touch surface comprises a touch-screen, the resulting system arranged to provide at least a game controller function; and
at least one networking element configured to enable the device to communicate with the game console controlled by at least the game controller function of the multiple-function device,
wherein the multiple-function device directs the HDTP control signals to at least a game console, and
wherein at least 3-dimensional (3D) control signals responsive to 3D aspects of touch measured by the HDTP touch surface are provided to control at least one 3D aspect of a visual response produced by the game.

2. The device of claim 1 wherein the HDTP touch surface comprises a capacitive sensor.

3. The device of claim 1 wherein the HDTP touch surface comprises an OLED array.

4. The device of claim 1 wherein the HDTP touch surface enables measurement of a roll angle.

5. The device of claim 1 wherein the HDTP touch surface enables measurement of a pitch angle.

6. The device of claim 1 wherein the HDTP touch surface enables measurement of a yaw angle.

7. The device of claim 1 wherein the multidimensional hypermedia object comprises a hyperlink.

8. The device of claim 1 wherein the networking element is further configured to provide an interface to a WiFi network.

9. The device of claim 1 wherein the networking element is further configured to network the device with the internet.

10. The device of claim 1 wherein the HDTP touch surface enables measurement of a pitch angle.

11. The device of claim 1 wherein the HDTP touch surface provides a control signal responsive to pressure applied to the touchscreen that is arranged to control an electronic game.

12. A game controller device comprising:
a processor for executing an algorithm for controlling a game;
a High Dimensional Touch Parameter (HDTP) touch surface for receiving user touch input and generating real-time tactile information, wherein the real-time tactile information is arranged to be processed to generate signals responsive to a multidimensional hypermedia object and HDTP control signals to control the game and wherein the HDTP touch surface comprises a touch-screen, the resulting system arranged to provide at least a game controller function; and at least one networking element configured to network the device to at least two game consoles, wherein the multiple-function device directs the HDTP control signals to at least the at least two game consoles, and wherein at least 3-dimensional (3D) control signals responsive to 3D aspects of touch measured by the HDTP touch surface are provided to control at least one 3D aspect of a visual response produced by the game.

13. The device of claim 12 wherein the HDTP touch surface comprises a capacitive sensor.

14. The device of claim 12 wherein the HDTP touch surface comprises an OLED array.

15. The device of claim 12 wherein the HDTP touch surface enables measurement of a roll angle.

16. The device of claim 12 wherein the HDTP touch surface enables measurement of a yaw angle.

17. The device of claim 12 wherein the multidimensional hypermedia object comprises a hyperlink.

18. The device of claim 12 wherein the networking element is further configured to provide an interface to a WiFi network.

19. The device of claim 12 wherein the device is further configured to network with the Internet.

20. The device of claim 12 wherein the HDTP touch surface provides a control signal responsive to pressure applied to the touchscreen that is arranged to control an electronic game.

* * * * *